(12) United States Patent
Weisser et al.

(10) Patent No.: US 7,709,781 B2
(45) Date of Patent: May 4, 2010

(54) ROTATION SENSOR FOR A SPRAYING ARM IN A DISHWASHER

(75) Inventors: Dietmar Weisser, Tuttlingen (DE);
Guido Schick, Mühlheim (DE);
Heinrich Müller, Tuttlingen (DE);
Wolfgang Häussler, Rottweil (DE);
Michael Bessler, Nufringen (DE)

(73) Assignee: Marquardt GmbH, Rietheim-Weilheim (DE)

( * ) Notice: Subject to any disclaimer, the term of this patent is extended or adjusted under 35 U.S.C. 154(b) by 0 days.

(21) Appl. No.: 11/972,967

(22) Filed: Jan. 11, 2008

(65) Prior Publication Data
US 2008/0173798 A1    Jul. 24, 2008

(30) Foreign Application Priority Data
Jan. 19, 2007    (DE)    ......... 10 2007 003 788

(51) Int. Cl.
*H01J 40/14*    (2006.01)
*G02B 6/42*    (2006.01)
*G08B 3/00*    (2006.01)

(52) U.S. Cl. ............... 250/215; 250/227.25; 134/57 D
(58) Field of Classification Search ............... 250/215, 250/227.25, 573–575; 134/57 D, 113, 104.1
See application file for complete search history.

(56) References Cited

U.S. PATENT DOCUMENTS

| | | | | |
|---|---|---|---|---|
| 5,596,320 | A | * | 1/1997 | Barnes ............... 340/962 |
| 5,616,929 | A | * | 4/1997 | Hara ............... 250/573 |
| 2002/0185162 | A1 | * | 12/2002 | Rosenbauer et al. ...... 134/57 D |
| 2005/0051201 | A1 | * | 3/2005 | Ashton et al. ............ 134/104.1 |

* cited by examiner

*Primary Examiner*—Thanh X Luu
(74) *Attorney, Agent, or Firm*—Burr & Brown

(57) ABSTRACT

A process and a device are provided for ascertaining the rotation of a liquid spray arm for a domestic appliance. Lighting means serves as a light transmitter and a photoreceiver serves as a light receiver. The lighting means and the photoreceiver are assigned a light-conducting element. At a first location of the light-conducting element, at least some light emitted from the lighting means is coupled to a path so that the light is guided in the light-conducting element by total reflection. At a second location of the light-conducting element that spaced apart from the first location in the direction of propagation of the light, the light guided in the light-conducting element is coupled out of the path so that the light is received by the photoreceiver. The intensity of the light received by the photoreceiver is evaluated by an evaluation circuit with respect to the rotation of the spray arm.

13 Claims, 6 Drawing Sheets

ROTATION SENSOR FOR A SPRAYING ARM IN A DISHWASHER

CROSS-REFERENCE TO RELATED APPLICATION

This application claims priority from German Application No. 10 2007 003 788.2, filed Jan. 19, 2007, the entirety of which is incorporated herein by reference.

FIELD OF THE INVENTION

The present invention relates to a process for ascertaining the rotation of a liquid spray arm, to a device for carrying out the process and to a corresponding rotation sensor for a domestic appliance.

BACKGROUND OF THE INVENTION

Spray arms for liquids, such as water, for example, are used in domestic appliances, such as dishwashers. For safety reasons, the rotation of the spray arm should be monitored. The configuration of previous solutions for ascertaining the rotation of the spray arm involves high outlay.

For example, DE 40 20 898 A1 discloses a rotation sensor for a dishwasher which detects the rotation of the spray arm. The rotation sensor may be configured with optical means in the manner of a light barrier. Such a rotation sensor involves high outlay with respect to being arranged on the spray arm, and is also susceptible to malfunctioning.

SUMMARY OF THE INVENTION

The object of the present invention is to specify a process for straightforwardly ascertaining the rotation of spray arms as well as an associated device therefor. In particular, such a rotation sensor can be inserted in the installation space of the internal illuminating unit of the dishwasher without requiring any changes to be made to the spray arms.

The process according to the present invention for ascertaining the rotation of a liquid spray arm uses electromagnetic radiation, in particular light, which is emitted from a transmitter. The emitted electromagnetic radiation, at a first location, is coupled into a path, in which the electromagnetic radiation is guided by means of total reflection, at the angle of total reflection. The electromagnetic radiation guided by means of total reflection, at a second location, is then coupled out of the path, and the coupled-out electromagnetic radiation is received by a receiver. The change in the proportion of total-reflection radiation in the receiver, finally, is evaluated in order to detect the rotation.

A device for carrying out this process includes a lighting means serving as a transmitter, in particular a light-emitting diode, and a photoreceiver serving as a receiver, in particular a phototransistor. The lighting means and the photoreceiver are assigned a light-conducting element. At a first location of the light-conducting element, at least some of the light emitted from the lighting means is coupled so that the light is guided in the light-conducting element by means of total reflection. At a second location of the light-conducting element, which is spaced apart from the first location in the direction of propagation of the light, the light guided in the light-conducting element is coupled out so that the light is received by the photoreceiver. The intensity of the light received by the photoreceiver is evaluated by an evaluation circuit with respect to the rotation of the spray arm.

A rotation sensor, which can be used in particular for a domestic appliance with a spray arm, such as a dishwasher, operates with optical means in order to detect the rotation of the spray arm. The sensor comprises a lighting means serving as a transmitter, a photoreceiver serving as a receiver, and a light-conducting element assigned to the lighting means and the photoreceiver. At least some of the light emitted from the lighting means is coupled in, at a first location of the light-conducting element, so that the light is guided in the light-conducting element by means of total reflection. The light guided in the light-conducting element is coupled out at a second location of the light-conducting element, which is spaced apart from the first location, in the direction of propagation of the light, so that the light is received by the photoreceiver. Such a rotation sensor is unaffected by contamination and operates very reliably. It is nevertheless a cost-effective rotation sensor which can be used, in particular, in the price-sensitive domestic-appliance sector.

The intensity of the light received by the photoreceiver can be easily evaluated by means of an evaluation circuit, such as a microprocessor, a microcontroller or the like, with respect to the rotation of the spray arm. The evaluation circuit may be arranged separately at a suitable location in the domestic appliance. For example, it may be the actual control means for the domestic appliance. It is also possible, however, for the evaluation circuit to be integrated in the rotation sensor, which enables the latter to be operated autonomously.

The lighting means is expediently a reliable light-emitting diode and/or the photoreceiver is expediently a cost-effective phototransistor. For the sake of compactness, it is recommended to arrange the lighting means on the internal illuminating unit of the domestic appliance, to be precise in particular in the housing of the internal illuminating unit. In another cost-effective configuration, which is distinguished in that the number of components is reduced, the lighting means may be the internal illuminating unit of the domestic appliance. Furthermore, it is also possible for the photoreceiver to be arranged on the internal illuminating unit of the domestic appliance, to be precise in particular in the housing of the internal illuminating unit.

The number of components is further reduced if the light-conducting element simultaneously serves as a covering for the internal illuminating unit. The covering may be configured for space-saving purposes in the manner of a prism for coupling the light in and/or out. The material used for the light-conducting element may expediently be a plastic which is transparent to light, such as insensitive plexiglas.

To summarize, in a particularly preferred configuration, in the housing of the internal illuminating unit with at least one transmitting diode, light is coupled into the covering of the illuminating unit at the angle of total reflection and is removed again at some other location. The surge of water from the spray arm couples light out by changing the total reflection. The change in the light transmission then serves as an indicator for ascertaining rotation.

A particular advantage achieved by the present invention is that no additional openings are required in the dishwasher. It is sufficient to modify the transparent covering of the internal lighting means. Furthermore, it does not matter if the adjustable spray arm is located at different heights. The rotation sensor can be arranged in the installation space of the internal lighting means without requiring any changes to be necessary with respect to the spray arm.

BRIEF DESCRIPTION OF THE DRAWINGS

An exemplary embodiment of the invention with various developments and configurations will be described in more detail hereinbelow and is illustrated in the drawings, in which.

DETAILED DESCRIPTION OF THE DRAWINGS

Figure 1:
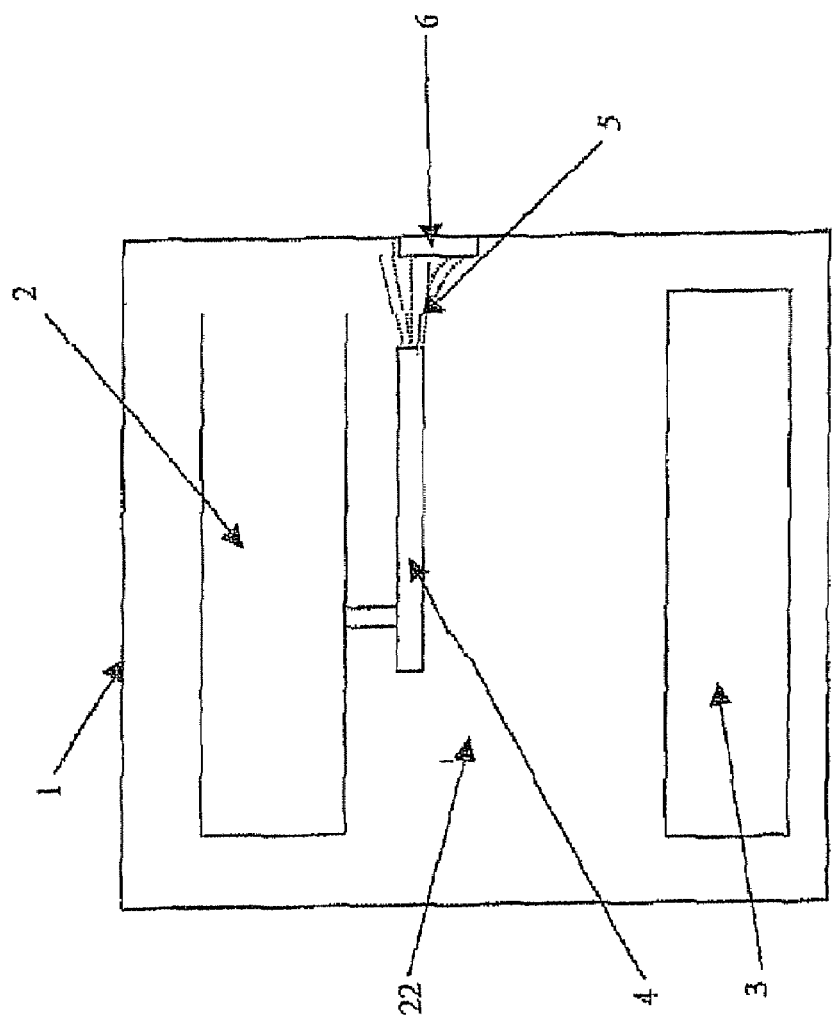
FIG. 1 is a schematic view of a dishwasher with liquid spray arm.

FIG. 1 shows, schematically, a dishwasher 1 with a top rack 2 and a bottom rack 3 for accommodating the dishes. A spray arm 4 is fitted on the bottom side of the top rack 2. A surge of water 5 exits from the spray arm 4 during operation, so that the spray arm 4 rotates due to the repulsion of the surge of water 5. The rotation of the spray arm 4 is detected by a sensor 6.

Figure 2:
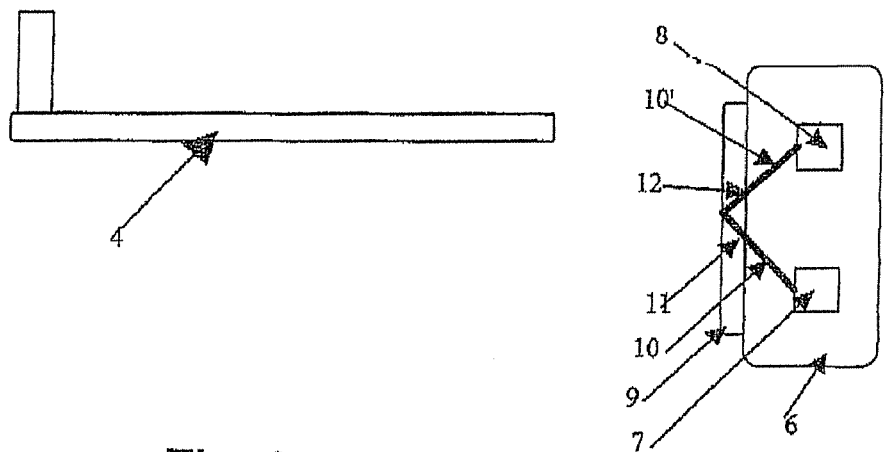
FIG. 2 is a schematic view of the liquid spray arm with a sensor in the case where the sensor has not been wetted with water.

The sensor 6 is explained in more detail in connection with FIG. 2. The sensor 6 has a lighting means 7, which may be a light-emitting diode. The lighting means 7 serves as a transmitter for light 10. The sensor 6 also has a photoreceiver 8, which may be a phototransistor. The photoreceiver 8 serves as a receiver for the light 10 emitted from the lighting means 7. The lighting means 7 and the photoreceiver 8 are assigned a light-conducting element 9. At a first location 11 of the light-conducting element 9, at least some of the light emitted from the lighting means 7 is coupled so that the light 10 is guided in the light-conducting element 9 largely by means of total reflection. The total-reflection light 10' guided in the light-conducting element 9 is coupled out, at a second location 12 of the light-conducting element 9, so that the light 10' is received by the photoreceiver 8. As shown in FIG. 2, the second location 12 is spaced apart from the first location 11 in the direction of the propagation of light 10, 10'. The photoreceiver 8 then generates an electric signal corresponding to the intensity of the light 10' received.

Figure 3:
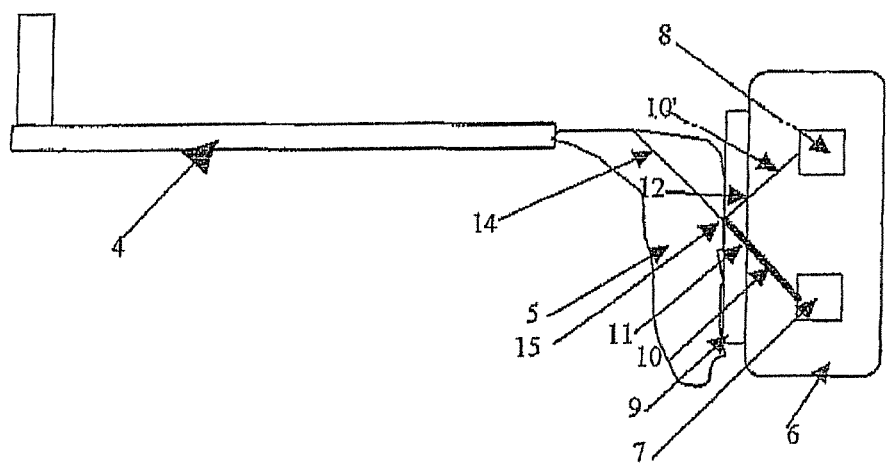
FIG. 3 shows the liquid spray arm with the sensor in the case where the sensor has been wetted with water.
Figure 4:
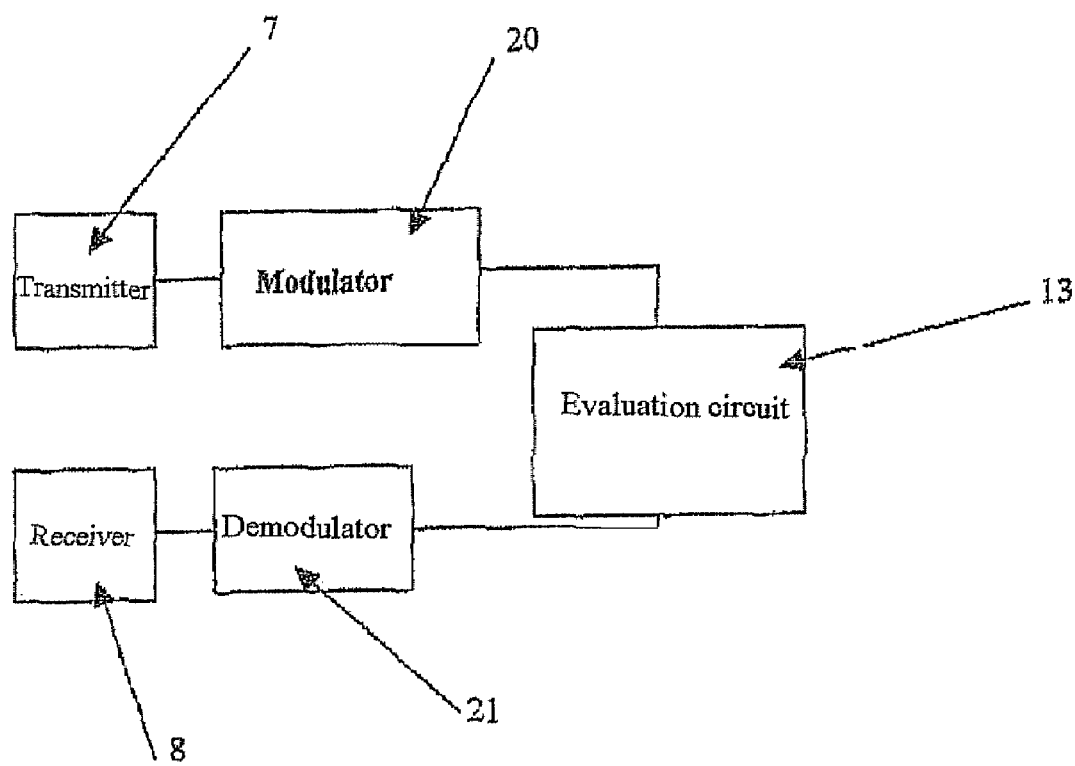
FIG. 4 is a block diagram showing the electric circuit of the sensor.

If the spray arm 4 rotates, it is positioned opposite the sensor 6 once in each revolution, as is shown in FIG. 3. The surge of water 5 then comes into contact with the light-conducting element 9 and wets the surface thereof. Due to the wetting, some of the light 14, rather than being totally reflected, is then coupled out at a third location 15 of the light-conducting element 9. The intensity of the total-reflection light 10' received at the photoreceiver 8 is then lower, in which case the electric signal of the photoreceiver 8 changes correspondingly. In an evaluation circuit 13 which is shown in FIG. 4, the intensity of the light 10' received by the photoreceiver 8 is then evaluated, in accordance with the electric signals generated, with respect to the rotation of the spray arm 4. The quality of the signal evaluated in the evaluation circuit 13 may also be increased by using a modulator 20 and a demodulator 21, which are schematically depicted in FIG. 4.

Figure 8:
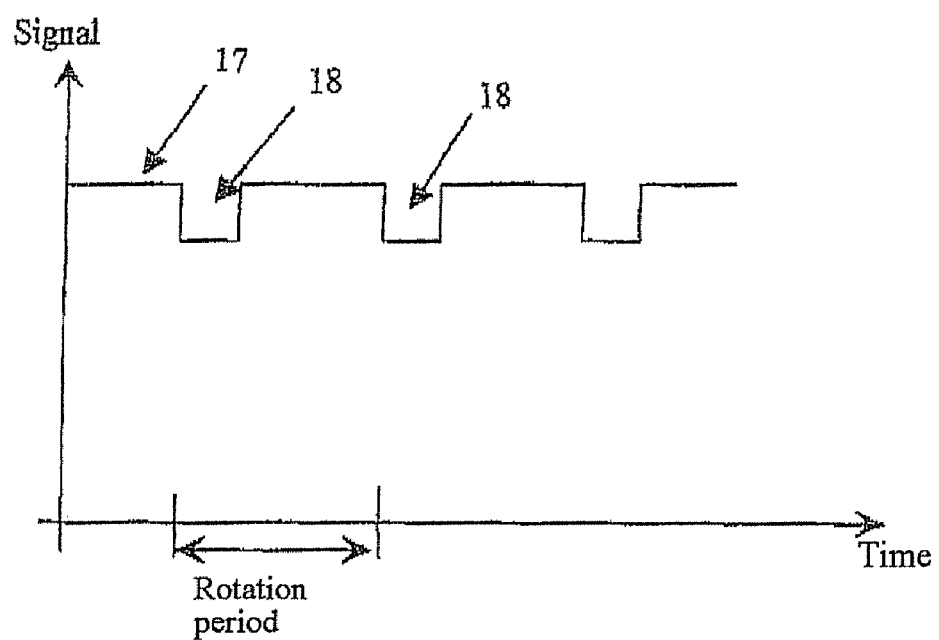
FIG. 8 is a diagram showing the electric signal generated by the sensor.

The operation of the sensor 6 in accordance with the process for ascertaining the rotation of the spray arm 4, then, is as follows. Electromagnetic radiation (i.e., light 10), is emitted from the transmitter 7. The emitted electromagnetic radiation (light) 10, at a first location 11, is coupled into the path (i.e., light-conducting element 9), in which the electromagnetic radiation 10 is guided by means of total reflection, at the angle of total reflection. The electromagnetic radiation (light) 10' guided by means of total reflection, at a second location 12, is coupled out of the path 9. The coupled-out electromagnetic radiation (light) 10' is then received by a receiver 8. Subsequently, the change in the proportion of total-reflection electromagnetic radiation (light) 10' in the receiver 8 is evaluated in order to detect the rotation. As shown in FIG. 8, the signal 17 generated by the receiver 8 when the path 9 has not been wetted with water 5 has a higher value than the signal 18 which is generated when the path 9 has been wetted with water 5. The rotation of the spray arm 4 can then be ascertained by way of the change in the signals 17, 18. If desired, it is possible to determine, by way of the distance between two successive signals 18, the rotation period of the spray arm 4 and thus the rotational speed thereof.

Figure 5:
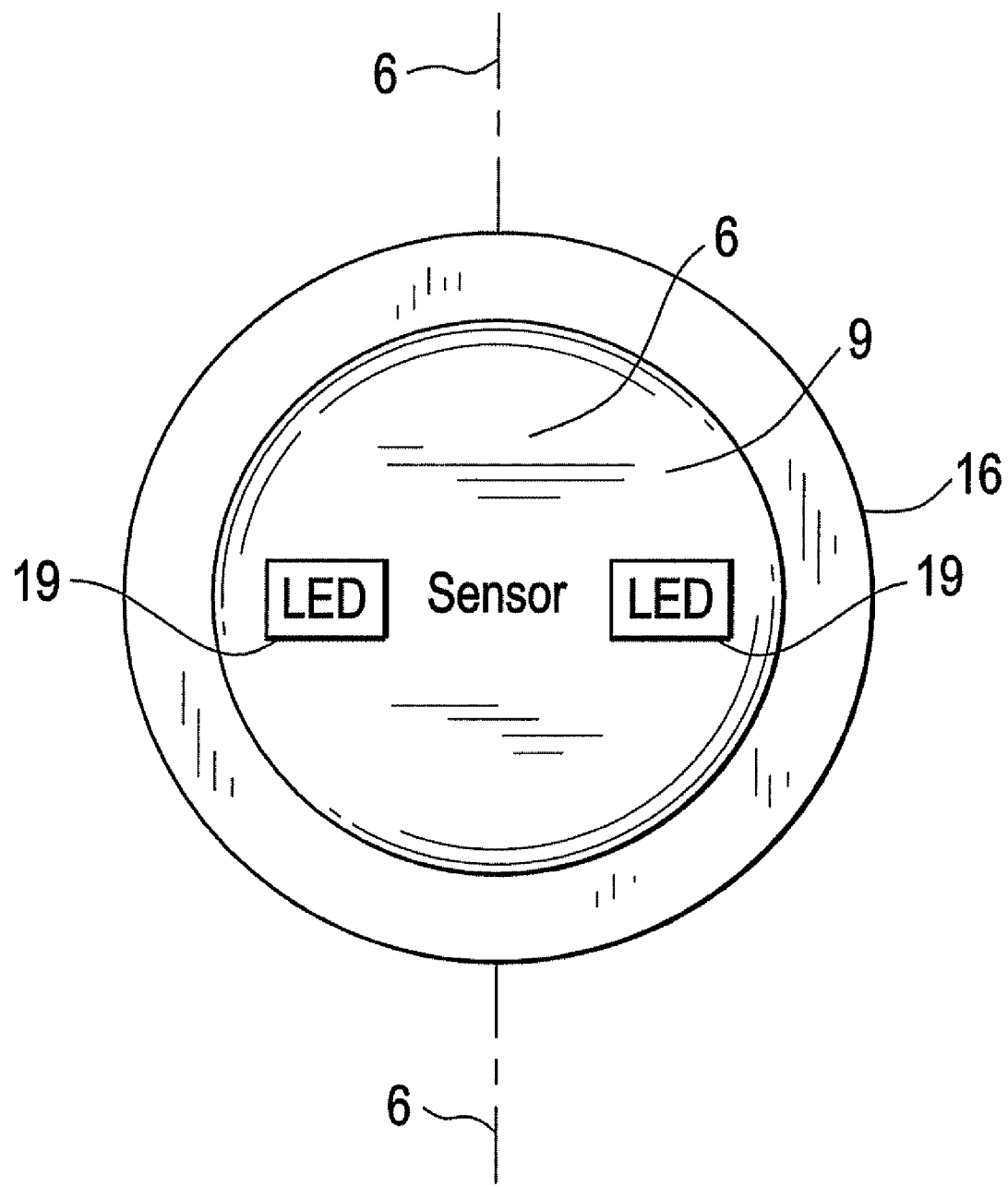
FIG. 5 is a plan view of the internal illuminating unit of the dishwasher.
Figure 6:
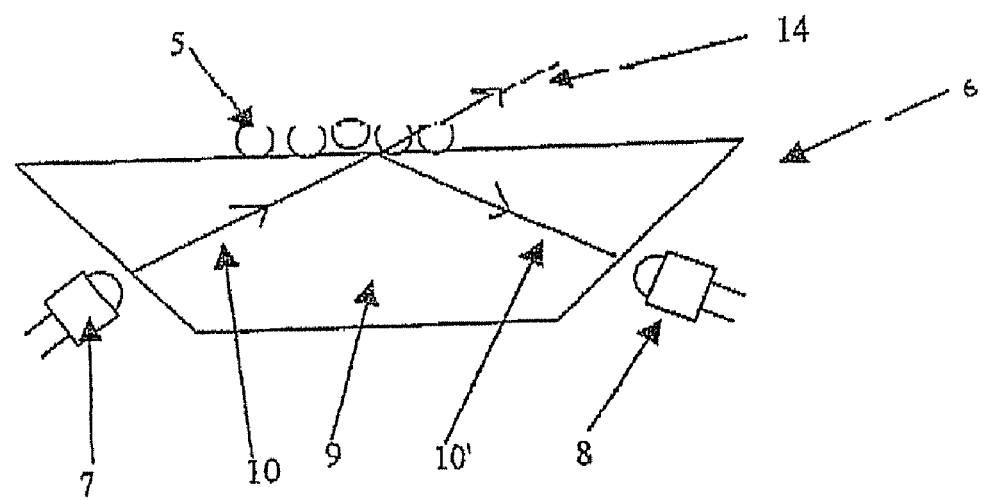
FIG. 6 is a cross-sectional view showing the light-conducting element from FIG. 5 taken along line 6-6.

The lighting means 7 is expediently arranged in the housing of the internal illuminating unit 16 of the dishwasher 1, as is shown in FIG. 5. The internal illuminating unit 16 includes light-emitting diodes 19, which serve in the conventional manner for illuminating the interior 22 of the dishwasher 1 (see FIG. 1). At the same time, the sensor 6 is arranged in the housing of the internal illuminating unit 16. The light-conducting element 9 simultaneously serves as a covering for the internal illuminating unit 16. The light-conducting element 9, which is integrated in the covering, may be configured in the manner of a prism for coupling the light 10, 10' in and/or out, as shown in FIG. 6. The light-conducting element 9 consists of a plastic which is transparent to light. For example, plexiglas is suitable for this purpose. If desired, the light-emitting diode 19 of the internal illuminating unit 16 can also be used, at the same time, as a lighting means for the sensor 6, although this has not been shown in any more detail.

Figure 7:
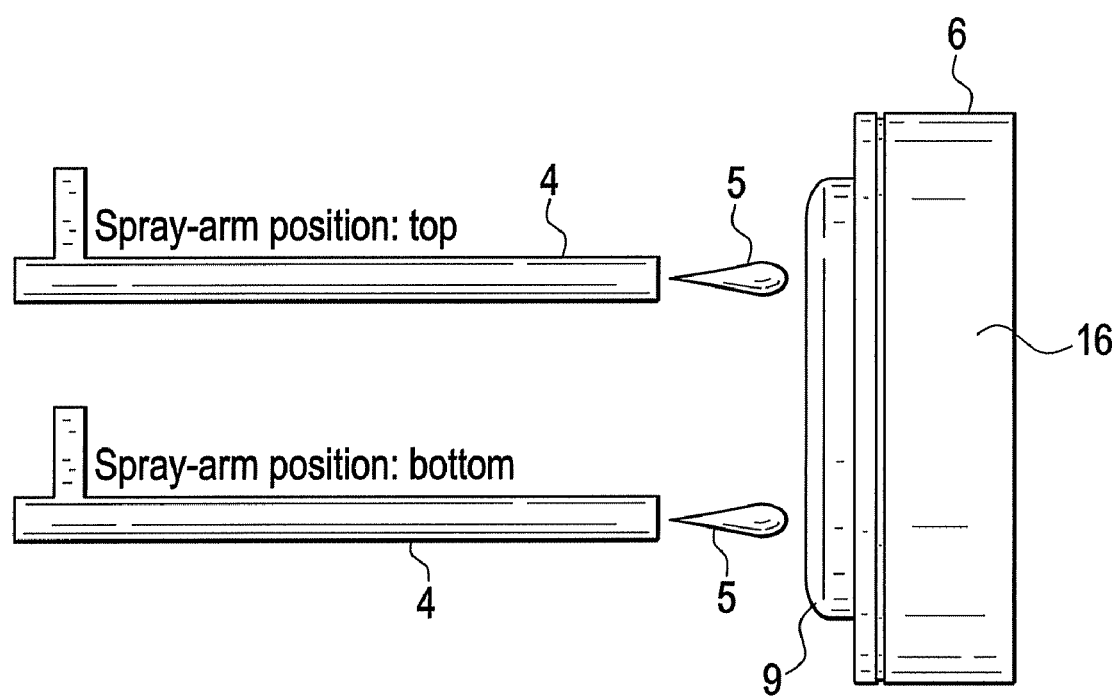
FIG. 7 shows a spray arm as in FIG. 2 in a height-adjustable form.

Due to the elongate prismatic configuration of the light-conducting element 9, the sensor 6 is also particularly suitable for use in conjunction with a height-adjustable spray arm 4. As shown in FIG. 1, the spray arm 4 is arranged on the top rack 2. If the top rack 2 is adapted to accommodate relatively large items for washing, for example plates, the top rack 2 can be adjusted downward, in which case the spray arm 4 likewise moves downward. This vertical movement of the spray arm 4 is also shown schematically in FIG. 7. As can be seen from a comparison of FIGS. 7 and 5, the light-conducting element 9 on the sensor 6 is also wetted with water following the height adjustment of the spray arm 4, and the rotation of the spray arm 4 can therefore be detected in this case as well.

The present invention is not restricted to the exemplary embodiment which has been described and illustrated herein. The present invention is not limited to dishwashers, but can also be used in other domestic appliances or in process engineering. In addition, the present invention can also be used for ascertaining the rotation of a spray arm which has a liquid other than water exiting from it.

List of reference numeral designations used in the accompanying drawing figures.
1: Dishwasher
2: (Top) rack
3: (Bottom) rack
4: Spray arm
5: Surge of water/water/liquid
6: Sensor
7: Lighting means/light-emitting diode/transmitter
8: Photoreceiver/receiver
9: Light-conducting element/path
10: (emitted) light/(emitted) radiation
10': (total-reflection) light/(total-reflection) radiation
11: First location (on light-conducting element)
12: Second location (on light-conducting element)
13: Evaluation circuit
14: Some of the light
15: Third location (of light-conducting element)

16: Internal illuminating unit
17: Electric signal (no water-wetting action)
18: Electric signal (with water-wetting action)
19: Light-emitting diode (for illuminating unit)
20: Modulator
21: Demodulator
22: Interior (of dishwasher)

The invention claimed is:

1. A process for ascertaining rotation of a liquid spray arm, comprising the steps of:

emitting electromagnetic radiation from a transmitter;

using a light-conducting element to couple the emitted electromagnetic radiation, at a first location, into a path in which the electromagnetic radiation is guided by means of total reflection, at an angle of total reflection;

using the light-conducting element to couple the electromagnetic radiation guided by means of total reflection out of the path at a second location;

receiving the coupled-out electromagnetic radiation by a receiver; and evaluating a change in a proportion of total-reflection radiation in the receiver when liquid emitted from the spray arm in a direction along an extension axis of the spray arm directly and immediately contacts the light-conducting element, said change thereby detecting the rotation of the liquid spray arm.

2. The process according to claim 1, wherein the transmitter comprises lighting means and the receiver comprises a photoreceiver, wherein at least some light emitted from the lighting means is coupled into the path at a first location of the light-conducting element that corresponds to the first location so that the light is guided in the light-conducting element by means of total reflection, wherein the light guided in the light-conducting element is coupled out of the path at a second location of the light-conducting element that corresponds to the second location and is spaced apart from the first location in the direction of propagation of the light so that the light is received by the photoreceiver, and wherein an intensity of the light received by the photoreceiver is evaluated by an evaluation circuit with respect to the rotation of the liquid spray arm.

3. The process according to claim 2, wherein the lighting means comprises a light-emitting diode.

4. The process according to claim 2, wherein the photoreceiver comprises a phototransistor.

5. A domestic appliance comprising;

a liquid spray arm;

an internal illuminating unit that illuminates the interior of the domestic appliance; and an optical sensor for detecting rotation of the liquid spray arm, said optical sensor comprising:

lighting means serving as a transmitter;

a photoreceiver serving as a receiver; and a light-conducting element assigned to the lighting means and the photoreceiver;

wherein at least some light emitted from the lighting means is coupled into a path at a first location of the light-conducting element, so that the light is guided in the light-conducting element by means of total reflection;

wherein the light guided in the light-conducting element is coupled out of the path at a second location of the light-conducting element, which is spaced apart from the first location in the direction of propagation of the light, so that the light is received by the photoreceiver; and wherein the lighting means is arranged in the illuminating unit of the domestic appliance.

6. The rotation sensor according to claim 5, wherein an intensity of the light received by the photoreceiver is evaluated by an evaluation circuit with respect to the rotation of the spray arm.

7. The rotation sensor according to claim 5, wherein the lighting means is a light-emitting diode.

8. The rotation sensor according to claim 5, wherein the photoreceiver is arranged on the internal illuminating unit of the domestic appliance.

9. The rotation sensor according to claim 8, wherein the photoreceiver is arranged within a housing of the internal illumination unit of the domestic appliance.

10. The rotation sensor according to claim 5, wherein the light-conducting element comprises a covering for the internal illuminating unit of the domestic appliance that is configured as a prism for coupling the light in and/or out of the path.

11. The rotation sensor according to claim 5, wherein the light-conducting element comprises a plastic which is transparent to light.

12. The rotation sensor according to claim 5, wherein the photoreceiver comprises a phototransistor.

13. The rotation sensor according to claim 11, wherein the light-conducting element comprises plexiglass.

* * * * *